United States Patent
Lee et al.

(10) Patent No.: US 10,154,499 B2
(45) Date of Patent: Dec. 11, 2018

(54) METHOD FOR SHARING WIRELESS RESOURCE INFORMATION IN MULTI-CELL WIRELESS COMMUNICATION SYSTEM AND APPARATUS FOR SAME

(71) Applicant: LG ELECTRONICS INC., Seoul (KR)

(72) Inventors: Seungmin Lee, Anyang-si (KR); Hanbyul Seo, Anyang-si (KR); Hakseong Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 535 days.

(21) Appl. No.: 14/398,679

(22) PCT Filed: May 21, 2013

(86) PCT No.: PCT/KR2013/004450
§ 371 (c)(1),
(2) Date: Nov. 3, 2014

(87) PCT Pub. No.: WO2013/176466
PCT Pub. Date: Nov. 28, 2013

(65) Prior Publication Data
US 2015/0133137 A1 May 14, 2015

Related U.S. Application Data

(60) Provisional application No. 61/649,874, filed on May 21, 2012, provisional application No. 61/750,345, (Continued)

(51) Int. Cl.
*H04W 72/08* (2009.01)
*H04W 72/04* (2009.01)
*H04W 28/16* (2009.01)

(52) U.S. Cl.
CPC ........ *H04W 72/0486* (2013.01); *H04W 28/16* (2013.01)

(58) Field of Classification Search
CPC . H04W 12/0486; H04W 28/16; H04W 24/00; H04W 72/082; H04W 16/10
See application file for complete search history.

(56) References Cited

U.S. PATENT DOCUMENTS

| | | |
|---|---|---|
| 2003/0214918 A1 | 11/2003 | Marinier |
| 2008/0069033 A1 | 3/2008 | Li et al. |
| 2008/0108363 A1 | 5/2008 | Yu et al. |
| 2008/0192660 A1 | 8/2008 | Li et al. |

(Continued)

FOREIGN PATENT DOCUMENTS

| | | |
|---|---|---|
| CN | 102111883 A | 6/2011 |
| CN | 102215534 A | 10/2011 |

(Continued)

*Primary Examiner* — Lester Kincaid
*Assistant Examiner* — William Wang
(74) *Attorney, Agent, or Firm* — Birch, Stewart, Kolasch & Birch, LLP

(57) ABSTRACT

The present invention relates to a method for sharing wireless resource information by a cell in a multi-cell wireless communication system. More particularly, the method for sharing wireless resource information by a cell according to the present invention comprises: a step of transmitting wireless resource information to a neighbor cell; and a step of receiving an acknowledgement message corresponding to the wireless resource information from the neighbor cell. The wireless resource information is information for changing the used of the wireless resource of a specific wireless resource region, and the acknowledgement message is a message indicating whether the change in use of the wireless resource is allowed in the neighbor cell.

5 Claims, 13 Drawing Sheets

Related U.S. Application Data filed on Jan. 5, 2013, provisional application No. 61/825,027, filed on May 18, 2013.

(56) References Cited

U.S. PATENT DOCUMENTS

| | | | |
|---|---|---|---|
| 2009/0221288 A1* | 9/2009 | Zhang | H04B 7/2606 455/434 |
| 2011/0013613 A1* | 1/2011 | Sung | H04L 1/1887 370/338 |
| 2011/0122851 A1* | 5/2011 | Gessner | H04W 72/0426 370/336 |
| 2011/0170496 A1* | 7/2011 | Fong | H04L 5/0053 370/329 |
| 2012/0176924 A1* | 7/2012 | Wu | H04W 72/0406 370/252 |
| 2012/0294273 A1* | 11/2012 | Ahn | H04L 1/0028 370/329 |
| 2012/0300647 A1* | 11/2012 | Nandagopal | H04L 43/0882 370/252 |
| 2013/0107704 A1* | 5/2013 | Dinan | H04B 7/2656 370/230 |
| 2013/0294268 A1* | 11/2013 | Xu | H04W 72/082 370/252 |

FOREIGN PATENT DOCUMENTS

| | | | |
|---|---|---|---|
| KR | 10-2007-0048678 A | 5/2007 | |
| KR | 10-2007-0049244 A | 5/2007 | |
| KR | 10-2007-0074564 A | 7/2007 | |
| KR | 10-1120293 B1 | 3/2012 | |
| WO | WO 03/098841 A1 | 11/2003 | |

* cited by examiner

FIG. 2
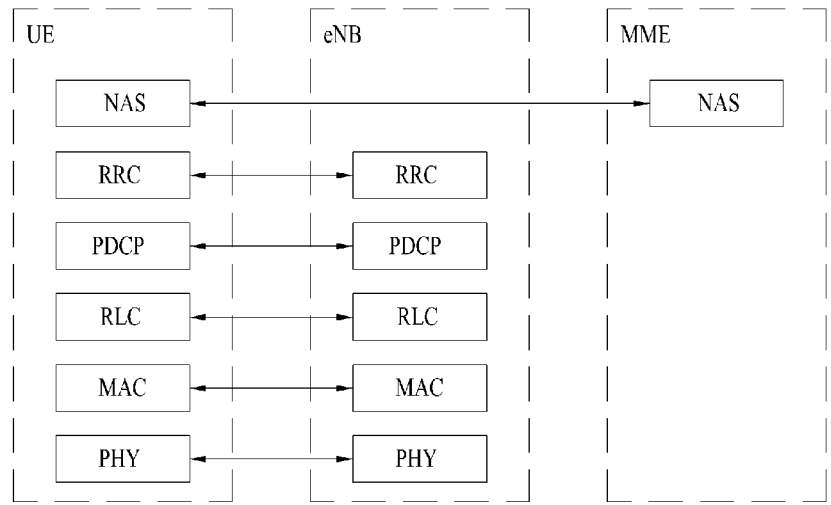
(a) control-plane protocol
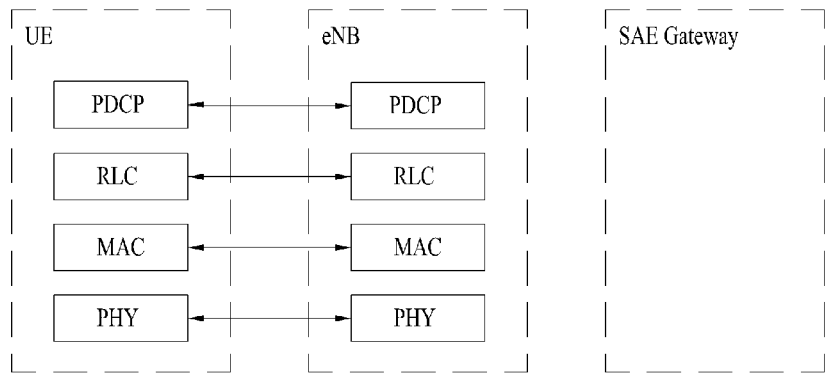
(b) user-plane protocol stack (Downlink-heavy Traffic Situation)

METHOD FOR SHARING WIRELESS RESOURCE INFORMATION IN MULTI-CELL WIRELESS COMMUNICATION SYSTEM AND APPARATUS FOR SAME

CROSS REFERENCE TO RELATED APPLICATIONS

This application is the National Phase of PCT International Application No. PCT/KR2013/004450, filed on May 21, 2013, which claims priority under 35 U.S.C. 119(e) to U.S. Provisional Application Nos. 61/649,874, filed on May 21, 2012, 61/750,345 filed on Jan. 8, 2013, and 61/825,027 filed on May 18, 2013. The contents of International Application No. PCT/KR2013/004450, and Provisional Application Nos. 61/649,874 and 61/750,345 are hereby expressly incorporated by reference into the present application.

TECHNICAL FIELD

The present invention relates to a wireless communication system, and more particularly, to a method of sharing wireless resource information in a wireless communication system and an apparatus therefor.

BACKGROUND ART

3GPP LTE ($3^{rd}$ generation partnership project long term evolution) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.44 MHz, 3 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

An object of the present invention is to provide a method of sharing wireless resource information in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of sharing radio resource information of a cell in a multi-cell wireless communication system includes the steps of transmitting the radio resource information to a neighbor cell and receiving a confirmation message from the neighbor cell in response to the radio resource information, wherein the radio resource information corresponds to information used for changing a use of a radio resource of a specific radio resource region and the confirmation message corresponds to a message indicating whether the change of the use of the radio resource is allowed in the neighbor cell.

Preferably, the confirmation message is determined by the neighbor cell based on at least one of an uplink-downlink communication load state of the neighbor cell and an expected interference amount on the specific radio resource region.

Preferably, the confirmation message is transmitted based on a predefined physical radio channel or an X2 interface.

Preferably, the specific radio resource region is configured to make the neighbor cell not perform uplink-downlink communication.

Preferably, the confirmation message indicates that the change of the use of the radio resource is not allowed on the specific radio resource region and the method can further include the step of receiving recommended radio resource use change information from the neighbor cell.

Preferably, the radio resource information includes information on at least one or more uplink-downlink (UL-DL) configurations and the confirmation message includes information on a specific UL-DL configuration allowed by the neighbor cell among the at least one or more UL-DL configurations.

Preferably, the neighbor cell may correspond to a cell of which a time synchronization difference value with the cell is less than a prescribed threshold value.

Preferably, the radio resource information includes information on the number of subframes in which the change of the use of the radio resource is performed.

Preferably, the specific radio resource region includes a radio resource used for transmitting and receiving a specific reference signal, More preferably, the specific reference signal is configured according to a predefined reference signal configuration information and the reference signal configuration information includes at least one selected from the group consisting of the number of antenna ports, a physical cell identifier, a virtual cell identifier, a type of a reference signal, a configuration index and transmit power of a reference signal.

Preferably, the radio resource information includes at least one of a subframe of a specific timing and a use of the subframe of the specific timing. The radio resource information further includes information on an uplink control channel transmission region of a serving cell or information on a specific reference signal transmission region.

Preferably, the change of the use of the radio resource is configured to use a radio resource configured for uplink communication for downlink communication or use a radio resource configured for the downlink communication for the uplink communication.

Preferably, the radio resource information further includes information on a resource utilization rate of the specific radio resource region.

To further achieve these and other advantages and in accordance with the purpose of the present invention, according to a different embodiment, a method of sharing radio resource information in a multi-cell wireless communication system includes the steps of receiving the radio resource information from a specific cell, determining whether to allow change of a use of a radio resource of the specific cell based on the radio resource information and an uplink-downlink communication load state and transmitting a confirmation message indicating whether to allow the change of the use of the radio resource to the specific cell, wherein the radio resource information corresponds to information used for the specific cell to change a use of a radio resource of a specific radio resource region.

Advantageous Effects

According to the present invention, in case of dynamically changing a radio resource in a wireless communication system according to a system load, communication can be efficiently performed in a manner of sharing information on the radio resource by a plurality of cells with each other.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

BEST MODE

Mode for Invention

Figure 1:
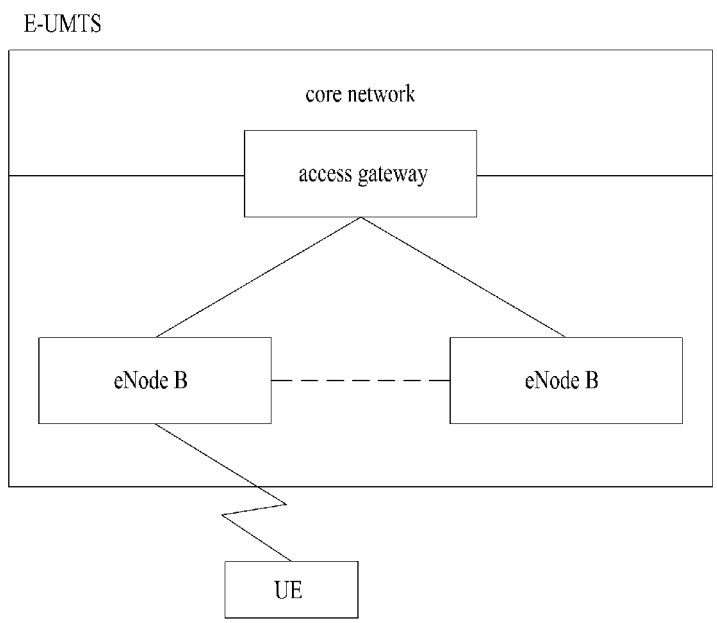
FIG. 1 is a schematic diagram of E-UMTS network structure as one example of a wireless communication system.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

Specific terminologies used for the following description may be provided to help the understanding of the present invention. And, the use of the specific terminology may be modified into other forms within the scope of the technical idea of the present invention.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. If there is an RRC connection between the RRC layer of the user equipment and the RRC layer of the network, the user equipment is in an RRC connected mode. Otherwise, the user equipment is in an RRC idle mode. An NAS (Non-Access Stratum) layer situated at the above of an RRC layer performs such a function as session management, mobility management and the like.

A single cell consisting of an eNode B is set to one of 1.4 MHz, 3 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
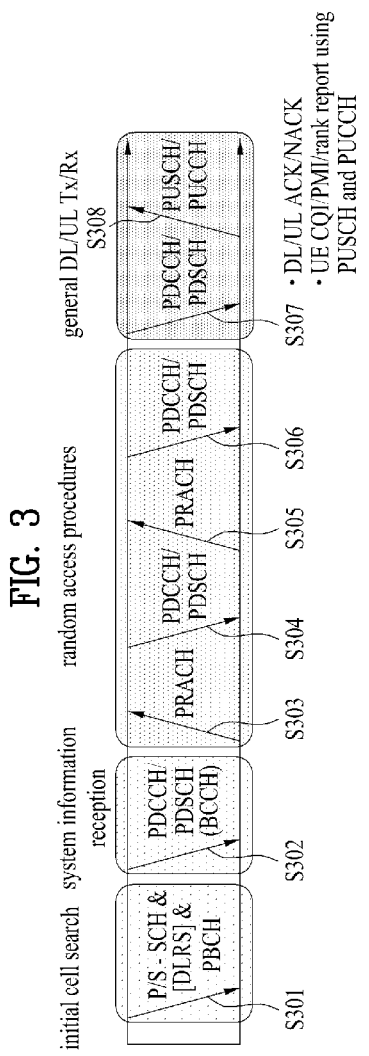
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and information carried on the physical downlink control channel (PDCCH). The user equipment may be then able to obtain detailed system information [S302].

Subsequently, the user equipment may be able to perform a random access procedure to complete the access to the eNode B [S303 to S306]. To this end, the user equipment may transmit a preamble on a physical random access channel (PRACH) [S303] and may be then able to receive a response message on PDCCH and the corresponding PDSCH in response to the preamble [S304]. In case of a contention-based random access procedure, it may be able to additionally perform a contention resolution procedure such as additional transmission of a PRACH [S305] and reception of PDCCH and the corresponding PDSCH [S306].

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CSI (Channel state information) and the like. In the preset specification, the HARQ ACK/NACK is simply called HARQ-ACK or ACK/NACK (A/N). The HARQ-ACK includes at least one selected from the group consisting of a positive ACK (simply ACK), a negative ACK (NACK), a DTX and NACK/DTX. The CSI includes CQI (Channel Quality Indication), PMI (Precoding Matrix Indication), RI (Rank Indication) information and the like. The UCI is normally transmitted via PUCCH. Yet, in case that both control information and traffic data need to be simultaneously transmitted, the UCI may be transmitted on PUSCH. Moreover, the UCI may be non-periodically transmitted via PUSCH in response to a request/indication made by a network.

Figure 4:
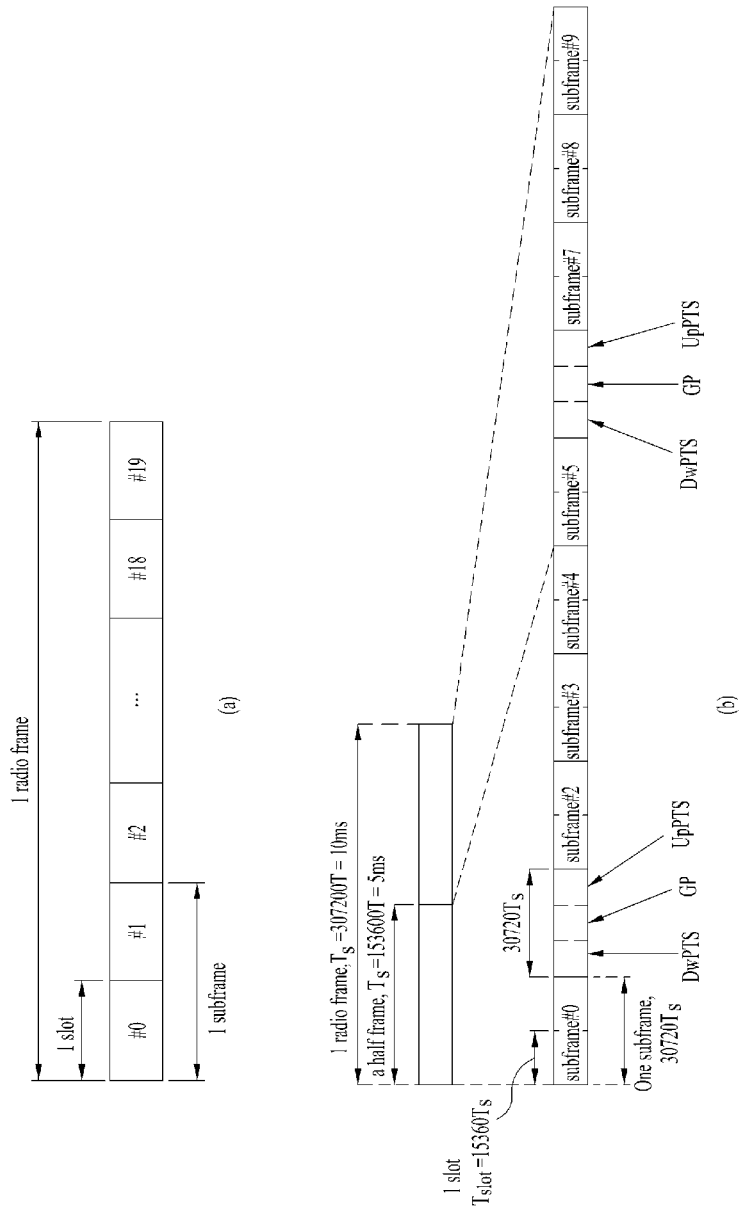
FIG. 4 is a diagram for a structure of a radio frame in LTE system.

FIG. 4 is a diagram for a structure of a radio frame in 3GPP LTE.

Referring to FIG. 4, in a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 4 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain.

Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 4 (b) is a diagram for a structure of a downlink radio frame of type 2. A type 2 radio frame includes 2 half frames. Each of the half frame includes 4 normal subframes each of which includes two slots and a special subframe including a DwPTS (downlink pilot time slot), a GP (guard period) and an UpPTS (uplink pilot time slot).

In the special subframe, the DwPTS is used for initial cell search, synchronization, or channel estimation in a user equipment. The UpPTS is used for channel estimation in a base station and matching an uplink transmission synchronization of a user equipment. In particular, DwPTS is used for DL transmission and UpPTS is used for UL transmission. In particular, UpPTS is utilized for the purpose of transmitting a PRACH preamble or an SRS. The guard period is a period for eliminating interference generated in uplink due to multi-path delay of a downlink signal between uplink and downlink.

Regarding the special subframe, configuration of the special subframe is defined by a current 3GPP standard document in Table 1 in the following. Table 1 shows DwPTS and UpPTS in case of $T_s=1/(15000\times 2048)$ and remaining area is configured as the guard period.

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Meanwhile, Table 2 in the following shows a structure of a type 2 radio frame, i.e., UL/DL subframe configuration in a TDD system.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, 'D' indicates a DL subframe, 'U' indicates a UL subframe, and 'S' indicates a special subframe. And, Table 2 also shows DL-UL switching periodicity in the UL/DL subframe configuration of each system.

The aforementioned structure of a radio frame is just an example. The number of subframes included in a radio frame, the number of slots included in a subframe and the number of symbols included in a slot can change in various ways.

Figure 5:
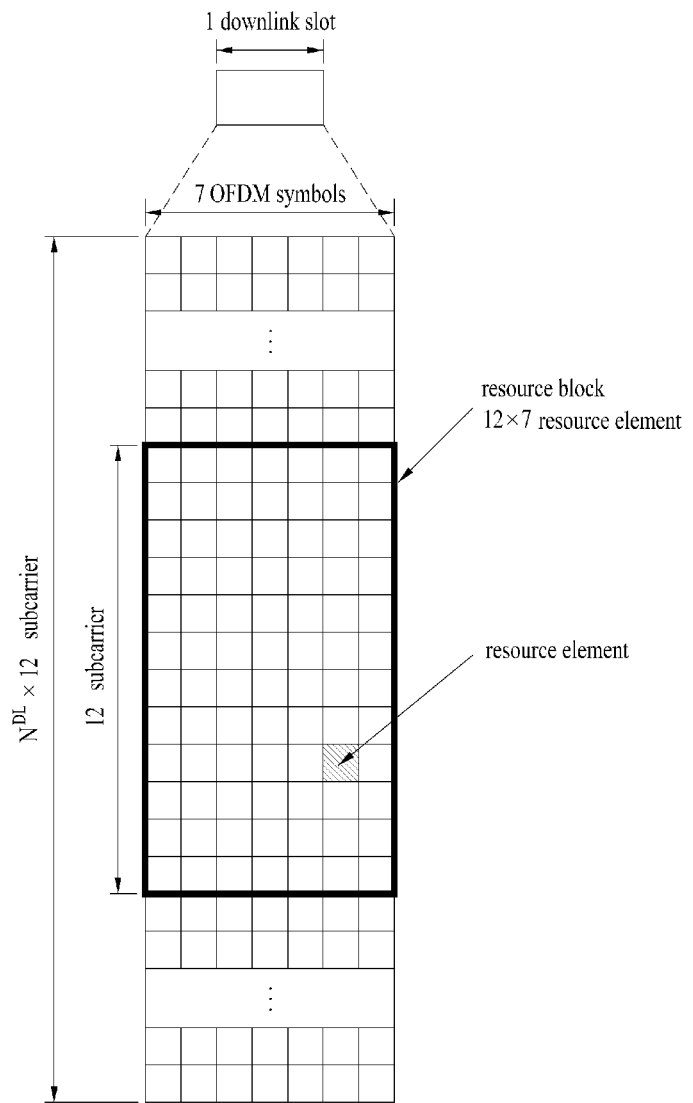
FIG. 5 is a diagram for one example of a resource grid for a downlink slot.

FIG. 5 is a diagram for one example of a resource grid for a downlink slot.

Referring to FIG. 5, a downlink slot includes $N_{symb}^{DL}$ OFDM symbol in time domain and includes $N_{RB}^{DL}$ resource block in frequency domain. Since each resource block includes $N_{sc}^{RB}$ subcarriers, a downlink slot includes $N_{RB}^{DL} \times N_{sc}^{RB}$ subcarriers in frequency domain. In FIG. 5, although it is depicted as a downlink slot includes 7 OFDM symbols and a resource block includes 12 subcarriers, by which the present invention may be non-limited. For instance, the number of OFDM symbol included in a downlink slot may vary depending on a length of a cyclic prefix (CP).

Each element on a resource grid is called a resource element (RE). One resource element is indicated by one OFDM symbol index and one subcarrier index. One RB includes $N_{symb}^{DL} \times N_{sc}^{RB}$ resource elements. The number ($N_{RB}^{DL}$) of resource block depends on a downlink transmission bandwidth configured in a cell.

Figure 6:
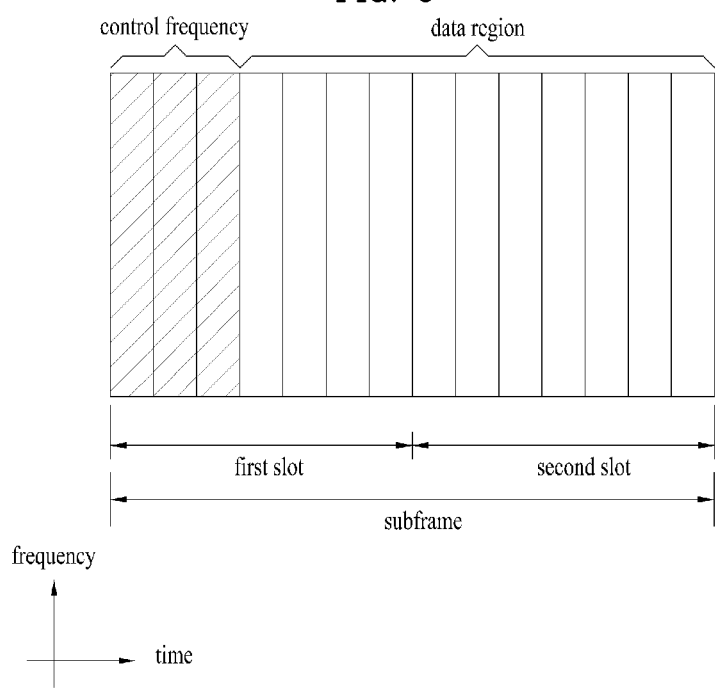
FIG. 6 is a diagram for an example of a structure of a downlink subframe.

FIG. 6 is a diagram for an example of a structure of a downlink subframe.

Referring to FIG. 6, maximum 3(4) OFDM symbols situated at a head part of a first slot of one subframe correspond to a control region to which control channels are assigned. The rest of OFDM symbols correspond to a data region to which PDSCH (physical downlink shared channel) is assigned. Examples of DL control channels used by LTE may include PCFICH (Physical Control Format Indicator Channel), PDCCH (Physical Downlink Control Channel), PHICH (Physical hybrid automatic repeat request indicator Channel) and the like. The PCFICH carried on a first OFDM symbol of a subframe carries the information on the number of OFDM symbols used for the transmission of control channels within the subframe. The PHICH carries HARQ ACK/NACK (hybrid automatic repeat request acknowledgement/negative acknowledgement) signal in response to an UL transmission.

Control information carried on PDCCH is called downlink control information (hereinafter abbreviated DCI). The DCI includes resource allocation information and different control information for a user equipment or a user equipment group. For instance, the DCI includes DL/UL scheduling information, a UL transmit (Tx) power control command and the like.

PDCCH is able to carry a transmission format and resource allocation information of DL-SCH (downlink shared channel), a transmission format and resource allocation information of UL-SCH (uplink shared channel), paging information on PCH (paging channel), system information on DL-SCH, resource allocation information of an upper layer control message such as a random access response transmitted on PDSCH, a transmit power control command set for individual user equipments within a user equipment (UE) group, a transmit power control command, activation indication information of VoIP (voice over IP) and the like. A plurality of PDCCHs can be transmitted in a control region and a user equipment is able to monitor a plurality of the PDCCHs. PDCCH is transmitted on an aggregation of a plurality of contiguous control channel elements (CCEs). CCE is a logical assignment unit used to provide PDCCH with a code rate in accordance with a state of a radio channel. CCE corresponds to a plurality of REGs (resource element groups). A format of PDCCH and the number of available bits of PDCCH are determined by the number of the CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or usage of PDCCH. If the PDCCH is provided for a specific user equipment, the CRC can be masked with an identifier of the corresponding user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). If the PDCCH is provided for a random access response, the CRC can be masked with RA-RNTI (random access-RNTI).

Figure 7:
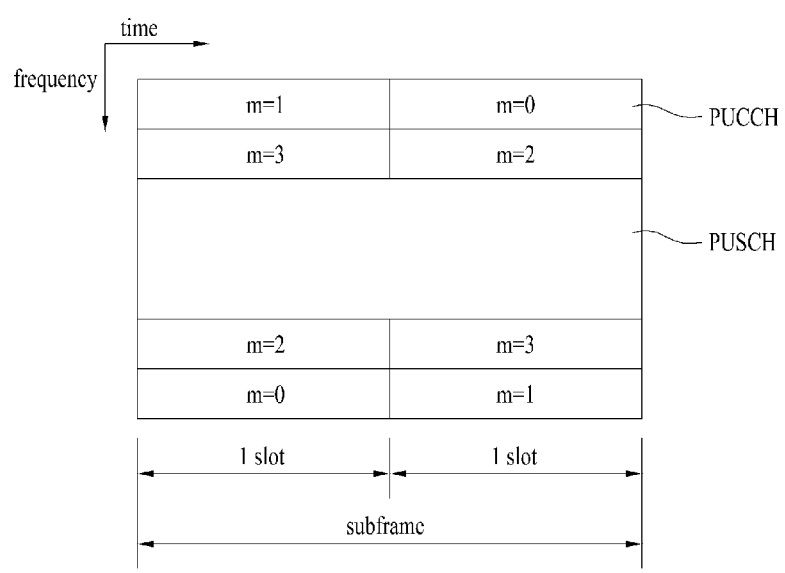
FIG. 7 is a diagram for a structure of an uplink subframe in LTE system.

FIG. 7 is a diagram for a structure of an uplink subframe in LTE system.

Referring to FIG. 7, an UL subframe includes a plurality (e.g., 2 slots) of slots. A slot may include different number of SC-FDMA symbols depending on a length of a CP. A UL subframe may be divided into a data region and a control region in frequency domain. The data region includes PUCCH and is used to transmit a data signal such as audio and the like. The control region includes PUCCH and is used to transmit uplink control information (UCI). PUCCH includes an RB pair situating at both ends of the data region on a frequency axis and hops on a slot boundary.

The PUCCH can be used to transmit following control information.

SR (scheduling request): information used to request UL-SCH resource. This information is transmitted using OOK (on-off keying) scheme.

HARQ ACK/NACK: a response signal transmitted in response to a DL data packet on PDSCH. This information indicates whether a DL data packet is successfully received. ACK/NACK 1 bit is transmitted in response to a single DL codeword. ACK/NACK 2 bits are transmitted in response to two DL codewords.

CSI (channel state information): feedback information for a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits are used per a subframe.

The amount of control information (UCI) capable of being transmitted by a user equipment in a subframe depends on the number of SC-FDMA available for transmitting the control information. The SC-FDMA available for transmitting the control information indicates remaining SC-FDMA symbols except SC-FDMA symbol used for transmitting a reference signal in the subframe. In case of a subframe to which an SRS (sounding reference signal) is set, a last SC-FDMA of the subframe is also excluded from the available SC-FDMA. A reference signal is used for coherent detection of PUCCH.

In the following, CoMP (Cooperative Multipoint Transmission/Reception) is explained.

A system appearing after LTE-A intends to introduce a scheme of enhancing performance of a system, which is enhanced by enabling many cells to cooperate with each other. This sort of scheme is called a cooperative Multipoint Transmission/Reception (hereinafter abbreviated CoMP). The CoMP is a scheme used by 2 or more base stations, access points or cells to cooperatively communicate with a user equipment to smoothly perform communication between the specific user equipment and the base stations, the access points or the cells. Throughout the present invention, a base station, an access point or a cell can be used as an identical meaning.

In general, inter-cell interference may decrease performance of a user equipment situated at a cell boundary and throughput of an average sector in a multi-cell environment where a frequency reuse index corresponds to 1. In order to reduce the inter-cell interference, a legacy LTE system adopted a simple and passive method such as a fractional frequency reuse (FFR) via UE-specific power control for a user equipment situated at a cell boundary to have a reasonable performance efficiency in an interference-limited environment. Yet, instead of reducing the use of frequency resource per each cell, it may be more preferable to reduce the ICI or reuse the ICI with a signal desired by a user equipment. In order to achieve the aforementioned purpose, the CoMP transmission scheme can be applied.

Figure 8:
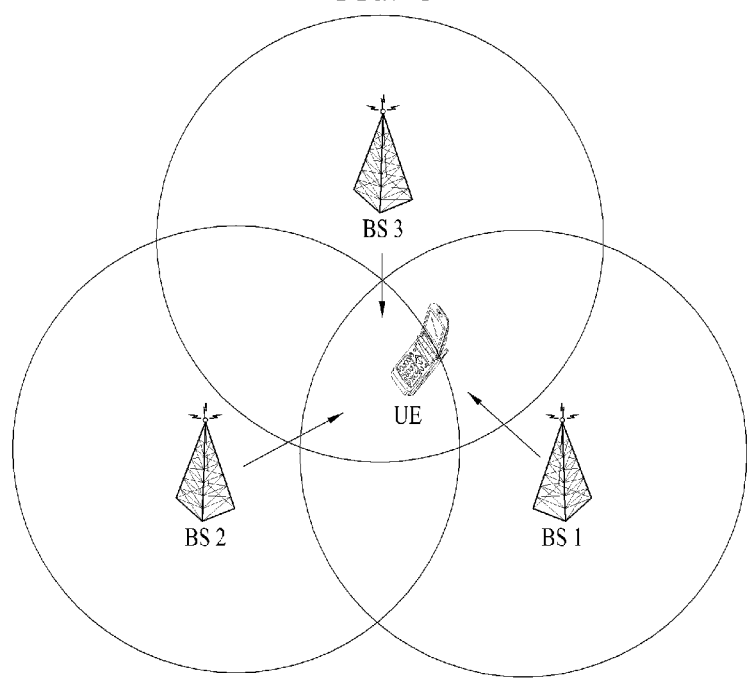
FIG. 8 is a diagram for an example of performing CoMP.

FIG. 8 is a diagram for an example of performing CoMP. Referring to FIG. 8, a wireless communication system includes a plurality of base stations (a BS 1, a BS 2 and a BS 3) performing the CoMP and a user equipment. A plurality of the base stations (the BS 1, the BS 2 and the BS 3) performing the CoMP can efficiently transmit data to the user equipment in a manner of cooperating with each other. The CoMP can be mainly classified into two types according to whether data is transmitted from each of a plurality of the base stations performing the CoMP:

Joint processing (CoMP Joint Processing (CoMP-JP))
Cooperative scheduling/beamforming (CoMP-CS/CB)

According to the CoMP-JT, data are simultaneously transmitted to a user equipment from each of a plurality of the base stations performing the CoMP and the user equipment increases reception capability by combining signals transmitted from each of a plurality of the base stations with each other. In particular, according to the CoMP-JP scheme, data can be used in each point (base station) of CoMP cooperation units. The CoMP cooperation units indicate a set of base stations used for a cooperative transmission scheme. The JP scheme can be classified into a joint transmission scheme and a dynamic cell selection scheme.

The joint transmission scheme means a scheme that PDSCHs are simultaneously transmitted from a plurality of transmission points (a part or a whole of the CoMP cooperation units). In particular, data transmitted to single user equipment can be simultaneously transmitted from a plurality of the transmission points. According to the joint transmission scheme, quality of a received signal can be coherently or non-coherently enhanced and interference interfering a different user equipment may be actively eliminated as well.

The dynamic cell selection scheme means a scheme that PDSCH is transmitted from a single transmission point (of the CoMP cooperation units) at a time. In particular, data transmitted to single user equipment on a specific time is transmitted from a single point and different points of the CoMP cooperation units do not transmit data to the user equipment on the specific time. A point, which transmits data to the user equipment, can be dynamically selected.

On the contrary, in case of the CoMP-CS, data is transmitted to single user equipment on a random moment via a base station and scheduling or beamforming is performed to minimize interference from a different base station. In particular, according to the CoMP-CS/CB scheme, the CoMP cooperation units can cooperatively perform beamforming for the data transmission transmitted to the single user equipment. In this case, although the data is transmitted from a serving cell, user scheduling/beamforming can be determined by coordination of cells of the CoMP cooperation units.

Meanwhile, in case of UL, coordinated multi-point reception means to receive a signal transmitted by coordination of a plurality of points, which are geographically away from each other. A CoMP scheme applicable to a case of UL can be classified into Joint Reception (JR) and a coordinated scheduling/beamforming (CS/CB).

The JR scheme means that a signal transmitted via PUSCH is received by a plurality of reception points. The CS/CB scheme means that PUSCH is received by a single point and user scheduling/beamforming is determined by coordination of cells of the CoMP cooperation units.

In the following, inter-cell interference between a plurality of cells is explained.

If a part of coverages of two base stations is overlapped with each other like a case that two base stations (e.g., a base station #1 and a base station #2) are arranged in a manner of being adjacent to each other, a user equipment served by one base station may be severely interfered by a strong downlink signal of another base station. As mentioned in the foregoing description, if inter-cell interference occurs, the inter-cell interference can be reduced by using an inter-cell cooperative signaling scheme between two base stations. In various embodiments of the present invention described in the following, assume that a signal is smoothly transmitted and received between two interfering/interfered base stations. For instance, assume a case that transmission and reception of a cooperative signal is very reliable between base stations in a manner that there exists a wired/wireless link (e.g., backhaul link or Un interface) including a good transmission condition such as a transmission bandwidth, time delay or the like between two base stations. And, it may assume a case that time synchronization between two base stations is matched with each other within an allowable error range (e.g., edges of downlink subframes of two interfering/interfered base stations are aligned) or a case that a difference (offset) of a subframe boundary between two base stations is clearly recognized by the two base stations.

Referring back to FIG. 8, the base station #1 (BS #1) corresponds to a macro base station serving a wide area with a high transmit power and the base station #2 (BS #2) corresponds to a micro base station (e.g., a pico base station) serving a small area with a low transmit power. As shown in an example of FIG. 8, if a UE, which is located at a cell boundary area of the base station #2 and served by the base station #2, is severely interfered by the base station #1, it may be difficult to perform efficient communication without an appropriate inter-cell cooperation.

In particular, in case of trying to lessen a service ice load of the base station #1, which is the macro base station, in a manner of making a large number of terminals to be connected with the base station #2, which is the micro base station of a low transmit power, it is highly probable to have a situation of the aforementioned inter-cell interference. For instance, when a user equipment intends to select a serving base station, the user equipment can calculate and compare reception power of each of downlink signals received from a plurality of base stations with each other in a manner of adding a prescribed adjusting value (a bias value) to reception power from the micro base station and not adding a prescribed adjusting value to reception power from the macro base station. By doing so, the user equipment can select a base station providing highest downlink reception power as the serving base station. Thus, more terminals can be connected to the micro base station. Although strength of a downlink signal actually received from the micro base station is weaker than strength of a signal received from the macro base station, the micro base station can be selected as a serving base station and the terminals connected with the micro base station may experience strong interference from the macro base station. In this case, if a separate inter-cell cooperation is not provided, it may be difficult for terminals located at the boundary of the micro base station to perform a proper operation due to the strong interference from the macro base station.

If there exist inter-cell interference between two base stations, it is necessary to perform appropriate cooperation between the interfering/interfered base stations to perform an efficient operation. A signal enabling the cooperative operation to be performed can be transceived via a link between the two base stations. In this case, if inter-cell interference occurs between a macro base station and a micro base station, the macro base station controls an inter-cell cooperative operation and the micro base station may perform an appropriate operation according to a cooperation signal informed by the macro base station.

The aforementioned inter-cell interference occurrence situation is just an example. It is apparent that embodiments of the present invention can be identically applied to a case (e.g., a case of inter-cell interference occurring between a HeNB of a CSG scheme and a macro base station of an OSG scheme, a case that a micro base station causes interference and a macro base station is interfered by the interference or a case that inter-cell interference exist between micro base stations or macro base stations and the like) different from the aforementioned situation.

Moreover, if a specific cell changes a use of a radio resource (e.g., a UL resource or a DL resource) for the purpose of DL or UL communication according to load state change of the specific cell, the present invention proposes a method of efficiently changing a use of a radio resource via cooperation with a neighbor cell.

If a specific cell changes a use of a radio resource according to a load state change of the specific cell, it is necessary to inform neighbor cells of related information. In particular, if the specific cell does not share information on the change of the use of the radio resource with neighbor cell(s), the specific cell and the neighbor cells may transceive considerable amount of interference (e.g., UE-to-UE interference, eNB-to-eNB interference and the like) with each other due to a communication direction different from each other and a random cell may have a problem in performing communication of appropriate quality.

Hence, in the following, a method for a specific cell to identify neighbor cells, which are affected by a dynamic operation of the specific cell changing a use of a radio resource, is explained via a predefined operation of measuring interference between base stations, an interference measurement result feedback operation (e.g., sharing interference measurement result via X2 interface between base stations) and the like.

Figure 9:
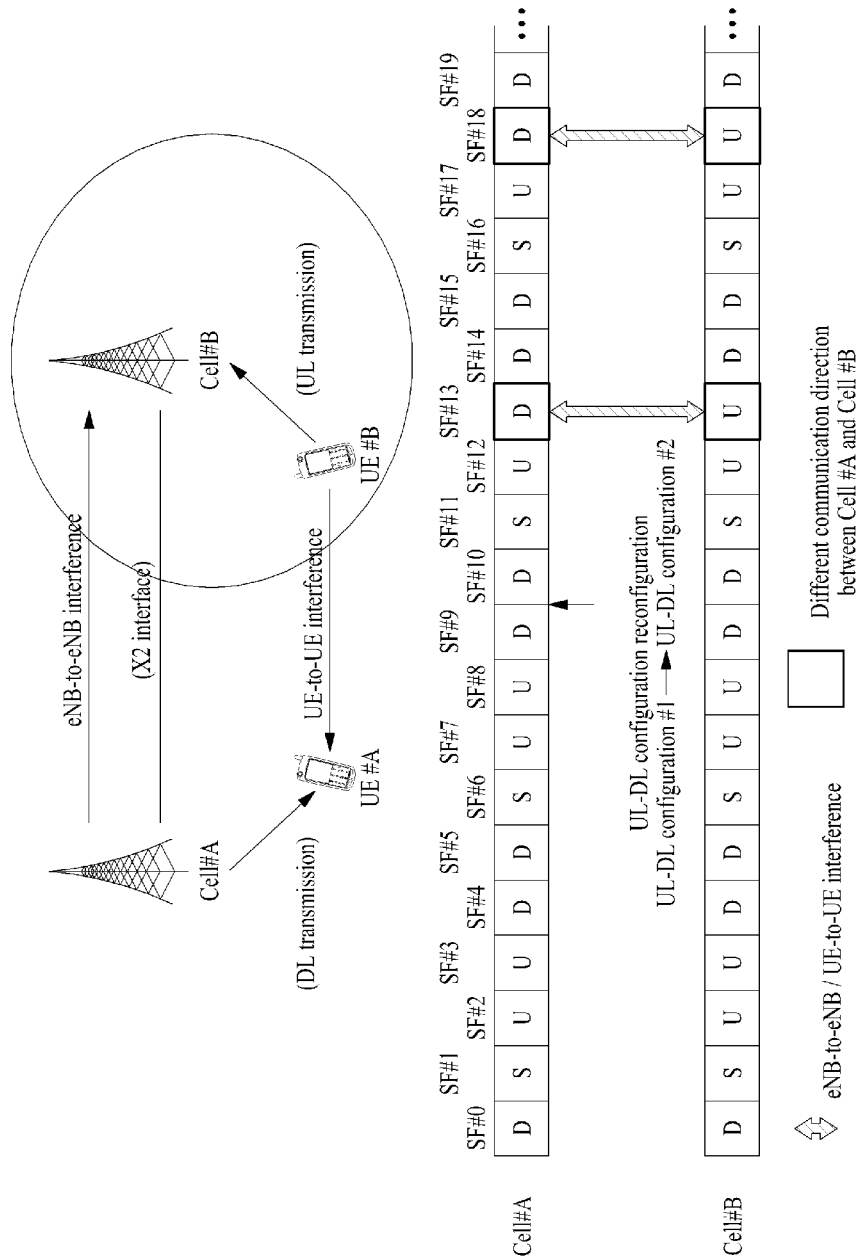
FIG. 9 is a diagram for explaining an inter-cell interference problem occurring when information on a change on a use of a radio resource is not shared with each other between cells.

FIG. 9 is a diagram for explaining an inter-cell interference problem occurring when information on a change of a use of a radio resource is not shared with each other between cells.

Referring to FIG. 9, it shows a case that a cell #A has changed a UL-DL subframe configuration from a UL-DL subframe configuration #1 ("DSUUDDSUUD") to a UL-DL subframe configuration #2 ("DSUDDDSUDD") in accordance with the increase of DL data communication load of the cell #A.

In FIG. 9, if the cell #A does not inform a cell #B of information on a dynamic change of a use of a radio resource of the cell #A, a UE #A performing DL communication with the cell #A receives UE-to-UE interference from a UE #B performing UL communication with the cell #B on a specific timing (e.g., an SF #13, an SF #18 and the like) and the cell #B performing UL communication with the UE #B receives eNB-to-eNB interference from the cell #A performing DL communication with the UE #A on the specific timing (i.e., the SF #13 and the SF #18).

Hence, in case that a specific cell dynamically changes a use of a radio resource in accordance with a load state change of the specific cell, it is required to have an additional inter-cell cooperation method to secure communication quality of a neighbor cell as well as communication quality of the specific cell in an appropriate state. The present invention proposes a preferable inter-cell cooperation method in case that a method of dynamically changing a use of a radio resource is applied.

Figure 10:
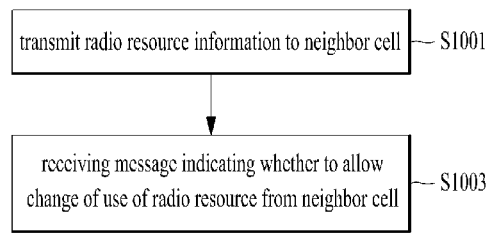
FIG. 10 is a flowchart for sharing wireless resource information shared by a specific cell according to the present invention.

FIG. 10 is a flowchart for sharing wireless resource information shared by a specific cell according to the present invention.

Referring to FIG. 10, radio resource information is transmitted to a neighbor cell [S1001]. In particular, according to the present invention, if a specific cell dynamically changes a use of a radio resource according to a load state change of the specific cell, the specific cell may inform a neighbor cell of information (e.g., a position in frequency/time domain, information on a usage change direction and the like) on a radio resource, which is intended by the specific cell to change, or a radio resource highly probable to be changed.

The information on the radio resource may include a changed or newly defined UL-DL configuration or may include a static resource or a flexible resource. For instance, a resource can be defined by a time/frequency resource in the present invention. The static resource and the flexible resource can be defined by a static subframe and a flexible subframe, respectively.

In the present invention, a static resource can be defined as a resource used for a usage (e.g., DL communication or UL communication) of a previously configured radio resource or a resource used according to a predefined radio resource usage configuration. Hence, the static resource according to the present invention can be defined by a resource selected from the group consisting of a resource used for a purpose identical to a use of a resource on SIB, a resource used for a purpose identical to a usage configured on a previous radio resource use reconfiguration periodicity interval, a resource used for a purpose identical to a usage on a predefined UL/DL reference HARQ timeline and a resource used for a purpose identical to a usage on a predefined UL/DL reference UL-DL configuration.

And, in the present invention, a flexible resource is defined as a resource used to dynamically change a usage of a radio resource. For instance, the flexible resource can be defined by a resource selected from a group consisting of a resource used for a purpose different from a usage of a resource on SIB, a resource used for a purpose different from a usage configured on a previous radio resource usage reconfiguration periodicity interval, a resource used for a purpose different from a usage on a predefined UL/DL reference HARQ timeline and a resource used for a purpose different from a usage on a predefined UL/DL reference UL-DL configuration.

Hence, according to the present invention, it is able to inform at least one or more neighbor cells of information on a radio resource using at least one selected from the group consisting of the aforementioned UL-DL configuration, the static resource and the flexible resource.

Having received the information on the radio resource, the neighbor cell can inform the specific cell of a confirmation message or a confirmation response message in response to the dynamic change of the use of the radio resource of the specific cell based on a current load state (e.g., a state that a DL or UL data communication load is high) of the neighbor cell or an amount of interference, which is expected to occur or calculated in case that the specific cell dynamically changes the use of the radio resource [S1003].

In this case, the information on the change of the use of the radio resource transmitted to the neighbor cell by the specific cell and the response message (or the response confirmation message) informed to the specific cell by the neighbor cell can be transmitted based on a predefined physical radio channel or an X2 interface. And, the confirmation message or the response confirmation message according to the present invention can be transmitted only when the neighbor cell allows the change of the use of the radio resource changed by the specific cell. Or, the confirmation message or the response confirmation message can be used to inform the specific cell of whether the change of the use of the radio resource is allowed.

Hence, according to the present invention, in case that the neighbor cell allows the change of the use of the radio resource of the specific cell, the neighbor cell does not intentionally perform communication in a region of the radio resource in which severe interference is received or a region of the radio resource in which severe interference is to be highly probably received from the specific cell (e.g., interference avoiding method in a time resource region). Or, the neighbor cell may limitedly schedule user equipments (e.g., user equipments positioned in the inside of a cell) capable of performing communication even in a state that interference exists. For instance, the neighbor cell can be configured not to inform the specific cell of information on an interference mitigation method (or interference avoiding method) performed in a region where the change of the use of the radio resource of the specific cell is performed. Or, if application of the interference mitigation method (or interference avoiding method), which is applied by the neighbor cell to the region where the change of the use of the radio resource is performed, has possibility of affecting communication of the specific cell or an operation of the specific cell dynamically changing the use of the radio resource, the neighbor cell can be configured to inform the specific cell of information on the interference mitigation method (or interference avoiding method) applied by the neighbor cell. Moreover, having received the information on the interference mitigation method (or interference avoiding method) from the neighbor cell, the specific cell may consider the information on the interference mitigation method to perform the operation changing the use of the radio resource and communication of a specific direction after the information is received.

According to the present invention, if the neighbor cell does not allow the change of the use of the radio resource of the specific cell, the specific cell can be configured not to perform the operation of the specific cell changing the use of the radio resource.

Additionally, if the neighbor cell does not allow the change of the use of the radio resource of the specific cell, the neighbor cell may inform the specific cell of appropriate recommended radio resource use change information again in consideration of a current load state of the neighbor cell or an amount of interference, which is expected to occur or calculated in case that the specific cell dynamically changes the use of the radio resource. For instance, the recommended radio resource use change information can be transmitted to the specific cell by the neighbor cell based on a predefined physical radio channel or an X2 interface. And, according to the present invention, having received the recommended radio resource use change information, the specific cell can transmit updated radio resource use change information to the neighbor cell again in a manner of reflecting the received information (i.e., the recommended radio resource use change information).

Figure 11:
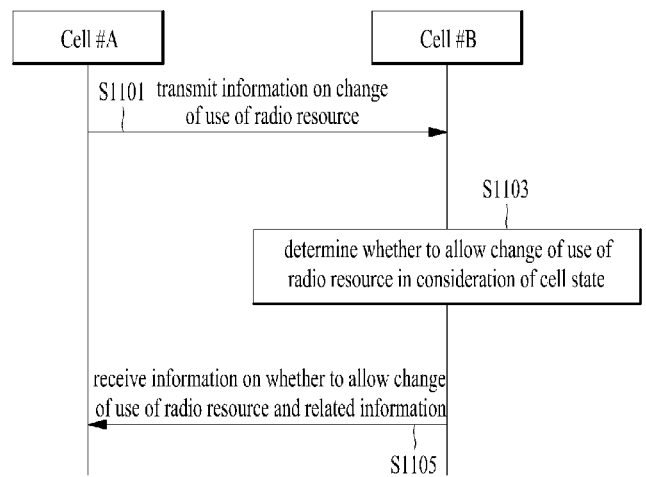
FIG. 11 is a flowchart for a data flow to share wireless resource information with each other between a plurality of cells according to one embodiment of the present invention.

FIG. 11 is a flowchart for a data flow to share wireless resource information with each other between a plurality of cells according to one embodiment of the present invention.

In FIG. 11, assume a case that radio resource information is shared in a wireless communication system including a cell #A and a cell #B.

According to the present invention, a cell #A transmits information on a change of a use of a radio resource to a cell #B [S1101].

Having received the information, the cell #B determines whether to allow the change of the use of the radio resource in consideration of a state of the cell #B, i.e., a UL-DL communication load state of the cell #B, an amount of interference which is expected in case that the cell #A changes a use of a specific radio resource (e.g., a subframe) and the like [S1103]. For instance, when the cell #A intends to use a specific UL subframe for a DL use, if it is determined that an amount of interference between the cell #A and the cell #B does not affect communication of the cell #B, the cell #B may determine to allow the change of the use of the radio resource of the cell #A.

Subsequently, the cell #B can transmit information on whether to allow the change of the use of the radio resource determined in the step S1103 and information on the change of the use of the radio resource to the cell #A [S1105].

Moreover, in case of applying the present invention to a network including a plurality of cells, an operation of changing a use of a radio resource or an operation of allowing the change of the use of the radio resource of a specific cell may affect an operation of changing a use of a radio resource of a neighbor cell and communication of a specific direction in sequence. Hence, the specific cell can identify the neighbor cells, which are affected by the operation of changing the use of the radio resource or the operation of allowing the change of the use of the radio resource of the specific cell, via a predefined interference measurement operation between a base station and a base station, an interference measurement result feedback operation (e.g., sharing an interference measurement result between base stations via an X2 interface) and the like.

In the present invention, a change of a use of a radio resource can be performed based on a predefined time/frequency unit (e.g., a subframe unit) or a legacy UL-DL configuration unit.

For instance, if the change of the use of the radio resource is performed based on the legacy UL-DL subframe configuration unit, a specific cell can inform a neighbor cell of a specific UL-DL subframe configuration information, which is intended to be changed by the specific cell or highly probable to be changed. Or, the specific cell may inform the neighbor cell of information on a plurality of UL-DL subframe configuration candidates, which are intended to be changed by the specific cell or highly probable to be changed.

Having received the information on the change of the use of the radio resource, the neighbor cell can inform the specific cell of information on a UL-DL subframe configuration (or a set of UL-DL subframes) allowable by the neighbor cell again based on the specific one UL-DL subframe configuration information or the information on a plurality of the UL-DL subframe configuration candidates.

For instance, in a heterogeneous network situation where a macro cell and a pico cell coexist, if the macro cell applies a fixed UL-DL subframe configuration #1 and the pico cell dynamically changes a UL-DL subframe configuration according to a load state of the pico cell, the macro cell may inform the pico cell that a UL-DL subframe configuration #2 and #4 are allowed in consideration of a data communication load state of the macro cell among UL-DL subframe configuration candidates, i.e., UL-DL subframe configuration #2, #4 and #5. As mentioned in the foregoing description, if the change of the use of the radio resource is performed based on the legacy UL-DL subframe configuration unit, the change of the use of the radio resource can be extensively applied to a case that the change is performed based on a predefined time/frequency unit (e.g., a subframe unit).

According to the present invention, if the neighbor cell receives information indicating that the specific cell is configured to perform a change of a use of a radio resource in a specific communication direction from the specific cell, the neighbor cell can be configured to inform the specific cell of information on at least one or more allowable time/frequency radio resources in consideration of a load state of the neighbor cell. In this case, the information on the allowable time/frequency radio resources can be configured based on a predefined time/frequency unit or a legacy UL-DL subframe configuration unit.

For instance, in a heterogeneous network where a macro cell and a pico cell coexist, assume that the macro cell applies a fixed UL-DL subframe configuration #1 and the pico cell dynamically changes a UL-DL subframe configuration according to a load state of the pico cell. In this case, if the pico cell informs the macro cell that the pico cell will perform a change of a use of a radio resource in a DL communication direction due to the increase of DL data communication load, the macro cell may inform the pico cell of allowable UL-DL subframe configuration #2, #4 and #5 (set) information in consideration of a UL load state of the macro cell.

Figure 12:
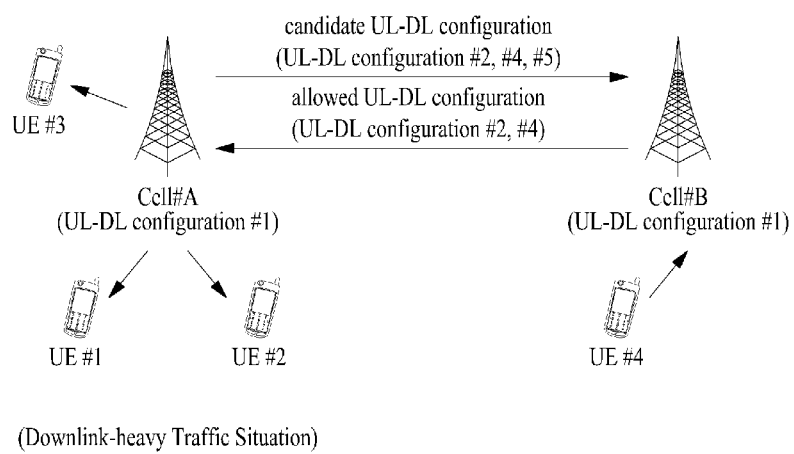
FIG. 12 is a diagram for an example of performing a change on a use of a radio resource between cells according to the present invention.

FIG. 12 is a diagram for an example of performing a change of a use of a radio resource between cells according to the present invention. Assume that a cell #A and a cell #B are initially configured by a UL-DL subframe configuration #1.

Referring to FIG. 12, the cell #A preferentially informs the cell #B of UL-DL subframe configuration #2, #4 and #5 information, which includes many DL subframes intended to be changed by the cell #A, according to a proposed scheme to efficiently process increased DL data communication load.

Having received the UL-DL subframe configuration information including many DL subframes, the cell #B informs the cell #A of an allowable UL-DL subframe configuration #2 and #4 information again among the UL-DL subframe configuration candidates received from the cell #A in consideration of a UL data communication load state of the cell #B.

Finally, the cell #A selects a UL-DL subframe configuration most suitable for a DL load state of the cell #A from the allowable UL-DL subframe configuration #2 and #4 received from the cell #B.

According to the present invention, in case that a specific cell informs a neighbor cell of information on a subframe set of which a use of the subframe set is changed via predefined signal (e.g., X2 interface), the specific cell can be configured to inform the neighbor cell of resource utilization information of the subframe set together. Or, in case that the specific cell informs the neighbor cell of information on a subframe set of which a use of the subframe set is highly probable to be changed via a predefined signal, the specific cell can be configured to inform the neighbor cell of resource utilization information of the subframe set together.

In the present invention, the resource utilization information indicates a measurement value measured by a random rate to identify whether corresponding subframes of the subframe set informed by the specific cell to the neighbor cell are actually used among the subframe set of which the use of the subframe set is changed or the subframe set of which the use of the subframe set is highly probable to be changed. Or, the resource utilization information may indicate a measurement value used for identifying whether the corresponding subframes are to be used for communication with a high probability.

In particular, according to the present invention, assume that the specific cell informs the neighbor cell of a subframe set including 4 subframes (e.g., an SF #(n+$k_0$), an SF #(n+$k_1$), an SF #(n+$k_2$) and an SF #(n+$k_3$)), the subframe set is used in a manner of changing a use of a radio resource, and the use of the radio resource of the subframe set is highly probable to be changed. In this case, the specific cell may inform the neighbor cell of resource utilization information of a random rate (e.g., 50%) together with the information of the subframe set. Having received the information, the neighbor cell is able to know that two subframes are actually used or highly probable to be used by the specific cell only among the 4 subframes. Hence, the neighbor cell can perform communication of the neighbor cell in consideration of interference impact occurred by the two subframes actually used or highly probable to be used by the specific cell.

Or, validity of the resource utilization information can be limitedly configured in a subframe set of which a use of the subframe set is changed or a subframe set of which a use of the subframe set is highly probable to be changed only. For instance, the specific cell may restrict the subframe set of which the use of the subframe set is changed or the subframe set of which the use of the subframe set is highly probable to be changed to a part of UL subframes on SIB. Of course, it may configure that the resource utilization information is restricted to all of UL subframes.

According to the present invention, assume that the neighbor cell receives resource utilization information together with information on a subframe set, which is used by changing a use of the subframe set or highly probable to be changed, consisting of the M number of subframes from the specific cell. Having received the information, the neighbor cell can be configured to identify a position of a subframe actually used by the specific cell based on the resource utilization information or a position of a subframe highly probable to be used by the specific cell based on a predefined rule. Hence, as an example of the rule, it may configure a use of a radio resource to be changed based on a descending order or an ascending order for subframe indexes of the M number of subframes.

For instance, if the neighbor cell receives information on a subframe set consisting of 4 subframes (i.e., an SF #4, an SF #7, an SF #8 and an SF #9) of which a use of the subframe set is changed or the subframe set of which a use of the subframe set is highly probable to be changed together with 50% resource utilization information from the specific cell, the neighbor cell may assume that the SF #9 and the SF #8 are actually used by the specific cell or highly probable to be used by the specific cell according to the rule (e.g., the descending order for the subframe indexes). In this case, the configuration of the descending order for the subframe indexes can prevent subframes including contiguous subframe indexes among the subframe set of which a use of the subframe set is changed or the subframe set of which a use of the subframe set is highly probable to be changed from being used as a UL use immediately after a DL use (i.e., a problem of overlapping a partial area of subframes with each other due to a propagation delay of DL communication and a timing advance (TA) of UL communication).

According to the present invention, in case that the specific cell informs the neighbor cell of information on the subframe set of which a use of the subframe set is changed by the specific ceii or the subframe set of which a use of the subframe set is highly probable to be changed by the specific cell via a predefined signal (e.g., X2 interface), information on a position of a subframe actually used for communication or information on a subframe highly probable to be used for communication can be configured to be additionally informed in a bit-map form.

According to the present invention, in case that the specific cell informs the neighbor cell of information on the subframe set of which a use of the subframe set is changed by the specific cell or the subframe set of which a use of the subframe set is highly probable to be changed by the specific cell via a predefined signal (e.g., X2 interface), the specific cell can be configured to additionally inform the neighbor cell of resource utilization information according to a subframe of which a use of the subframe is changed or a subframe of which a use of the subframe is highly probable to be changed in a bitmap form or a predefined format. Or, the specific cell can be configured to additionally inform the neighbor cell of resource utilization information according to a predefined subframe group of which a use of the subframe group is changed or a subframe group of which a use of the subframe group is highly probable to be changed.

In this case, the resource utilization information can be defined as a measurement value used for identifying whether a subframe of which a use of the subframe is changed or a subframe of which a use of the subframe is highly probable to be changed is actually used for communication or is highly probable to be used for communication. The aforementioned examples of the present invention can also be extensively applied to a case that resources of frequency domain are classified into a resource set of which a use of the resource set is changed and a resource set of which a use of the resource set is highly probable to be changed.

According to the present invention, in order for the specific cell to efficiently support a dynamic change of a use of a radio resource of the neighbor cells, the specific cell can be configured to inform the neighbor cells of information on at least one of radio resources of a specific timing not used by the specific cell for a predetermined communication use and radio resources on a specific timing to be used for communication with a low transmit power via a predefined signal.

For instance, in a TDD system, neighbor cells receiving information on radio resources of a specific timing from a specific cell consist of cells of which time synchronization difference or subframe synchronization difference between cells is less than a predetermined threshold value. In particular, if the specific cell informs the neighbor cells of information on subframes of a specific timing not to be used for a predetermined communication use or information on radio resources of a specific timing to be used for communication with a low transmit power and the neighbor cells use the subframes for different uses according to a system load state of the neighbor cells, it may avoid additional interference caused by a difference of time synchronization between the subframes of the specific timing or a difference of subframe synchronization assumed by the specific cell and the neighbor cells.

According to the present invention, in a heterogeneous network where a macro cell and pico cells coexist, if the pico cells dynamically change a use of a radio resource in accordance with a load state of the pico cells, interference caused by a communication direction different from each other between cells can be avoided. In particular, when the macro cell uses a subframe of a specific timing as a DL use without a cooperation between cells and the pica cell uses the subframe of the specific timing as a UL use, if the pico cell performs communication in UL on the timing, high level of interference interferes the communication of the pico cell due to DL communication of the macro cell. On the contrary, according to the present invention, if the pico cell uses the subframes in a manner of changing a use of the subframes based on the information on the subframes of the specific timing not to be used for the predetermined communication use or the information on the radio resources of the specific timing to be used for communication with a low transmit power received from the macro cell, the interference caused by a different communication direction can be avoided from the macro cell. For instance, having received the information on the subframes not to be used for the predetermined communication use or the information on the subframes to be used for communication with a low transmit power from the macro cell, the pico cells can be configured to use the subframes of the specific timing for a random use according to a load state of the pico cells.

According to the present invention, the number of the subframes not to be used for the predetermined communication use or the number of the subframes to be used for communication with a low transmit power informed to the neighbor cells by the specific cell can be configured according to a load state of the specific cell. In particular, the number of the subframes of the specific timing is randomly configured by the specific cell, is configured by a predetermined specific value for an operation of changing a use of a radio resource of the neighbor cells, is configured by a request of the neighbor cell or is configured via negotiation between cells.

Moreover, the subframes of the specific timing not to be used for the predetermined communication use or the subframes of the specific timing to be used for communication with a low transmit power informed to the neighbor cells by the specific cell can be defined as a flexible subframe. Depending on an implementation example, the flexible subframe can be implemented by a type among types including a blank subframe, an almost blank subframe (ABS), a zero-power ABS, a nonzero-power ABS and a MBSFN subframe.

Hence, having received information on subframes configured by an ABS frame type or a MBSFN subframe type or information on subframes configured by the aforementioned flexible subframe from a specific cell (e.g., macro cell), neighbor cells (e.g., pico cells) can be configured to use the subframes for a random use according to a load state of the neighbor cells. In this case, the ABS subframe may correspond to either a zero-power ABS or a nonzero-power ABS.

If a DL subframe on SIB of the specific cell is defined as a flexible subframe, exceptionally, it may configure the flexible subframe to identically transmit a specific reference signal (e.g., CRS), which is used to be transmitted in a legacy DL subframe. In this case, a type of the specific reference signal configured to be transmitted in the flexible subframe according to the present invention may be restricted to a reference signal (e.g., CRS or CSI-RS) used for RLM/RRM (radio link monitor/radio resource management) operation of a legacy UE. And, a CRS configured to be transmitted in the flexible subframe can be configured to have a form of a CRS transmitted in an MBSFN subframe. For instance, the CRS transmitted in the flexible subframe can be configured to have such a form as a CRS not transmitted on a PDSCH region and a CRS transmitted on a PDCCH region only. Moreover, information related to a radio resource of the aforementioned specific timing or a flexible subframe configuration can be shared with each other between a base station and a user equipment via a predefined signal.

And, if a DL subframe on SIB of the specific cell is defined as a flexible subframe, it may configure a specific reference signal (e.g., CRS, CSI-RS), which is used to be transmitted in a legacy DL subframe, not to be transmitted in the flexible subframe. In this case, information on whether to apply the aforementioned configuration, information on a reference signal which is configured not to be transmitted in the flexible subframe or the like can be shared with each other between a base station and a user equipment via a predefined signal.

According to the present invention, if a DL subframe on SIB of the specific cell is defined as a flexible subframe and a specific reference signal (e.g., CRS) is configured to be transmitted in the flexible subframe, the neighbor cells using the flexible subframe as a UL use or a DL use can be configured to apply a rate-matching (RM) operation or a puncturing (PC) operation to the reference signal in consideration of interference received from the specific reference signal of the specific cell transmitted in the flexible subframe. Moreover, information on the flexible subframe, information on the rate-matching or information on the puncturing can be shared with each other between a base station and a user equipment via a predefined signal.

According to present invention, the specific cell can inform the neighbor cell of configuration information on the specific reference signal transmitted in the flexible subframe via a predefined signal. For instance, the configuration information on the specific reference signal of the specific cell can include at least one selected from the group consisting of the number of antenna ports, a physical cell identifier, a virtual cell identifier, a type of a reference signal, a configuration index and transmit power of a reference signal. The specific cell can inform the neighbor cells of the configuration information using a predefined signal. Or, the neighbor cells using the flexible subframe in which the specific reference signal is transmitted as a UL or a DL data communication use may be able to configure 0 transmit power to be assigned to positions of resource elements (REs) to which the reference signal is transmitted in consideration of interference received from the specific reference signal. Moreover, as an example, the configuration information on the specific reference signal, in this case, information on application of a corresponding rule or information on the rule can be shared with each other between a base station and a user equipment via a predefined signal.

And, the specific cell can be configured to inform the neighbor cells of not only information on flexible subframes but also information on a use of the flexible subframes. In this case, the use of the flexible subframes is randomly determined by the specific cell in consideration of information on a UL/DL load state of each of the neighbor cells received from the neighbor cells. Or, the use of the flexible subframes can be configured by a specific use in a manner of being defined in advance or being negotiated between cells.

Additionally, the specific cell can be configured to inform the neighbor cells of not only the information on the flexible subframes but also information on a resource region (e.g., a resource block (RB) or a subframe) to which a considerable amount of interference is given from the specific cell in case of using the flexible subframe. For instance, the resource region to which the considerable amount of interference is given from the specific cell can be defined by a UL control channel (PUCCH) transmission region of the specific cell, a specific reference signal (e.g., CRS or CSI-RS) transmission region or the like. In particular, the UL control channel transmission region of the specific cell can be defined by a UCI (e.g., UL A/N, CSI (RI/PMI/CQI)) transmission region in the flexible subframe and the specific reference signal transmission region can be defined by a region in which a reference signal is transmitted to maintain RLM/RRM operation of a legacy UE in the flexible subframe.

Additionally, according to the present invention, if time synchronization or subframe synchronization is not matched with each other between cells, the specific cell may inform a neighbor cell of information on timing to which an updated UL-DL configuration is actually applied together with information transmitted to the neighbor cell by the specific cell. For instance, having received information on a radio resource from the specific cell, the neighbor cell can be configured to transmit a response message in response to the update UL-DL configuration information and a response message in response to the timing to which the updated UL-DL configuration is actually applied.

And, according to the present invention, the information on the flexible subframes, which is informed to the neighbor cells by the specific cell, can be configured to be transmitted to neighbor cells only of which a difference value is less than a predefined threshold value on the basis of time synchronization or subframe synchronization of the specific cell. A set of cells sharing the information on the flexible subframes with each other including the specific cell can be defined as a synchronized cell set.

In particular, in a heterogeneous network situation where a macro cell and a pico cell coexist, if a network operator configures a network in a manner that time synchronization difference or subframe synchronization difference between pico cells situating at the inside of a communication region of the macro cell and the macro cell is maintained to be less than a predefined threshold value, the synchronized cell set can be defined by the macro cell and all pico cells situating at the inside of the communication region of the macro cell.

And, the synchronized cell set can be formed in a manner that each of cells decodes or tracks predefined synchronization signals or reference signals (e.g., CRS, CSI-RS) of different neighbor cells. In particular, each of the cells draws difference values from either time synchronization or subframe synchronization between a cell and different cells and enables the difference values to be shared with each other between the cells via a predefined signal (e.g., X2 interface). By doing so, the synchronized cell set can be configured to be formed in a distributed form. Hence, the synchronized cell set can be formed in a distributed method via cooperation between cells or negotiation between cells. Or, the synchronized cell set can also be formed in a dynamic form via cooperation/negotiation between cells.

Figure 13:
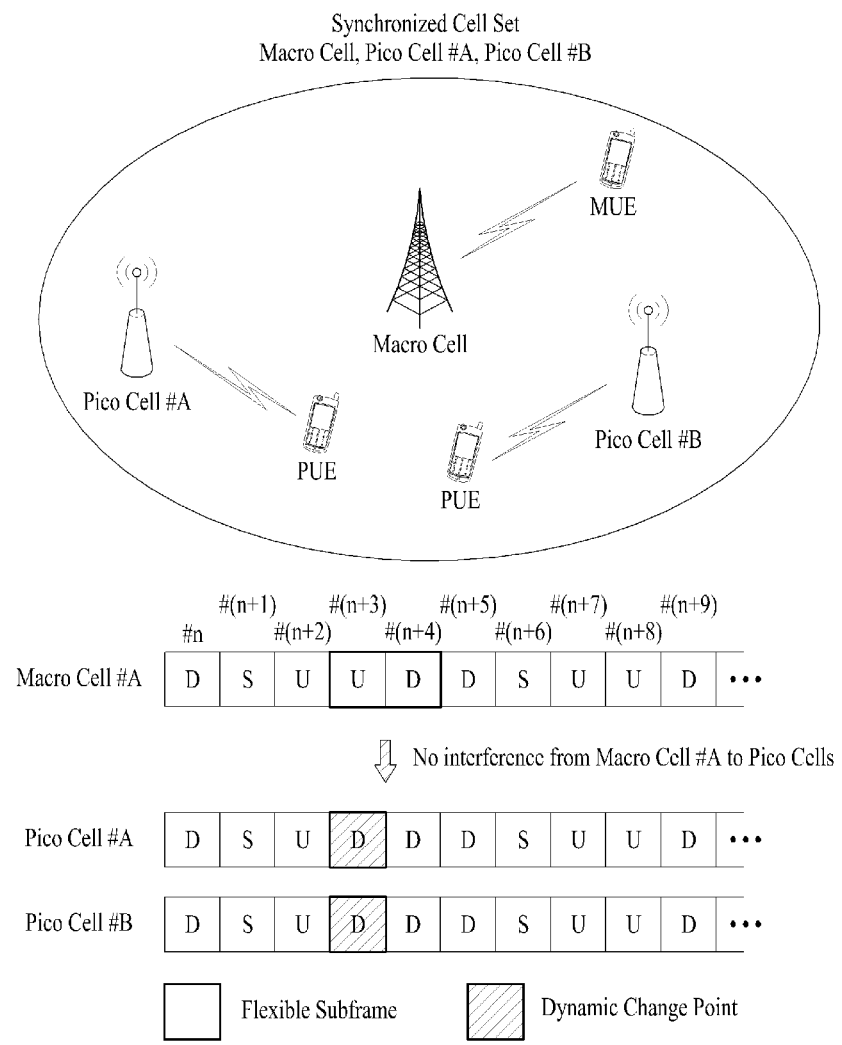
FIG. 13 is a diagram for a synchronized cell set configured according to the present invention.

FIG. 13 is a diagram for a synchronized cell set configured according to the present invention.

Referring to FIG. 13, it is assumed that a heterogeneous network situation where a macro cell and pico cells coexist. The macro cell, a pico cell #A and a pica cell #B are defined as a synchronized cell set. In FIG. 13, assume that SIB-based UL-DL configuration of the macro cell and that of the pico cells correspond to a UL-DL configuration #1.

According to embodiment of FIG. 13, the macro cell configures an SF # (n+3) and an SF # (n+4) as flexible subframes and informs synchronized neighbor pica cells belonging to the cell set of information on the flexible subframes (i.e., the SF # (n+3) and the SF # (n+4)). Hence, the pico cells can use the flexible subframes (i.e., the SF # (n+3) and the SF # (n+4)) in a manner of changing a use of the flexible subframes without interference, which occurs due to a different communication direction, received from the macro cell.

And, according to the present invention, if a specific cell signals that a UL subframe on SIB is designated as an ABS (e.g., a zero-power ABS or a nonzero-power ABS) or an MBSFN subframe form, neighbor cells, which has received the signal, can be configured to use the subframe (i.e., the UL subframe on the SIB) for a random use in accordance with a load state of the neighbor cells. For instance, the aforementioned subframes can be defined as the aforementioned flexible subframe.

And, according to the present invention, if a specific cell signals that a UL subframe on SIB is designated as an ABS (e.g., a zero-power ABS or a nonzero-power ABS) or an MBSFN subframe form, neighbor cells, which has received the signal, can be configured to use the subframe (i.e., the UL subframe on the SIB) for a random use in accordance with a load state of the neighbor cells. For instance, the aforementioned subframes can be defined as the aforementioned flexible subframe.

According to the present invention, there may exist subframe sets including interference characteristics different from each other due to a different communication direction between cells. First of all, according to the present invention, a plurality of subframes are divided into the predefined number of subframe sets in consideration of a type of interference or a kind of interference. One or more channel state information (CSI) deducting and reporting operations are configured in at least a part of the subframe sets among the predefined number of subframe sets. Or, one or more interference estimating operations or a channel state information (CSI) process can be configured in at least a part of the subframe sets among the predefined number of subframe sets.

For instance, in a situation that a macro cell and pico cells, which are situating at the inside of a communication region of the macro cell, coexist, it may assume that the pico cells performs an operation of dynamically changing a use of a radio resource only according to a cell load state change, the macro cell designates specific subframes as ABS (e.g., zero-power ABS or nonzero-power ABS) and the macro cell signals to the pico cells for corresponding information.

In this case, the pico cells can classify (the predefined number) a plurality of subframes into two subframe sets (i.e., a set #A and a set #B). The set #A and the set #B can be configured as a subframe set of a position designated as ABS and a subframe set of a position designated as a non-ABS, respectively. Moreover, the subframe classification configuration of the pico cells can be configured based on whether there exist interference from the macro cell.

In particular, since there is no interference or less interference received from the macro cell due to the ABS configuration and there exist interference between the pico cells only in the set #A, it may configure a plurality of channel state information (CSI) deducting and reporting operations in the set #A. Or, an interference estimating operation or a channel state information (CSI) process can be configured in the set #A. For instance, if there exist less interference received from the macro cell and interference received in a DL subframe of a serving pico cell from dynamically changing subframes of a neighbor pico cell or interference in the DL subframe of the serving pico cell received from statically used subframes of the neighbor pico cell is relatively strong in the set #A only, two channel state information (CSI) deducting and reporting operations can be configured in the set #A.

On the contrary, since the interference from the macro cell is relatively stronger than the interference between pico cells in the set #B due to the non-ABS configuration, one channel state information (CSI) deduction and reporting operation (or an interference estimating operation or a channel state information (CSI) process) can be configured in the set #B.

Hence, in the present invention, a plurality of channel state information (CSI) deduction and reporting operations can be performed in a part of specific subframe sets only among the predefined number of subframe sets. Or, a plurality of interference estimating operations or a channel state information process can be configured in a part of the subframe sets among the predefined number of subframe sets.

In particular, a subframe set in which a plurality of channel state information (CSI) deduction and reporting operations are configured among the predefined number of subframe sets can be restricted to statically used DL subframes (e.g., DL subframes on SIB) or DL subframes of which a use of the DL subframes are changed (e.g., UL subframes on SIB). Of course, a subframe set in which a plurality of interference estimating operations or a channel state information (CSI) process are configured among the predefined number of subframe sets can be restricted to statically used DL subframes or DL subframes of which a use of the DL subframes are changed.

According to the present invention, when a macro cell limitedly sets an ABS (e.g., zero-power ABS or nonzero-power ABS) to DL subframes statically used by pico cells only, if a subframe set in which at least one of a plurality of channel state information (CSI) deducting and reporting operations, an interference estimating operation and a channel state information process is configured is restricted to the statically used DL subframes among the predefined number of subframe sets, it may also indicate that the subframe set is restricted to the DL subframes only designated as ABS by the macro cell.

According to the present invention, a subframe set in which at least one of a plurality of channel state information (CSI) deducting and reporting operations, an interference estimating operation and a channel state information process is configured can be configured to be restricted to subframes designated as ABS (e.g., zero-power ABS or nonzero-power ABS) by the macro cell among the predefined number of subframe sets. Moreover, the subframe set can be configured to be restricted to DL subframes designated as ABS by the macro cell, subframes designated as non-ABS by the macro cell or DL subframes.

Additionally, configurations for the aforementioned subframe sets can be extensively applied to define a subframe set in which one channel state information (CSI) deducting and reporting operation, an interference estimating operation or a channel state information process is configured among the predefined number of subframe sets.

According to the present invention, in a situation that a macro cell and pico cells, which are situating at the inside of a communication region of the macro cell, coexist, in case that the pico cells only perform an operation of dynamically changing a use of a radio resource according to a cell load state change, the macro cell designates specific subframes as ABS (e.g., zero-power ABS or nonzero-power ABS) and signals the pica cells for corresponding information, at least one of a channel state information (CSI) deducting and reporting operation, an interference estimating operation and a channel state information process can be independently applied.

For instance, assume that a set #A and a set #B, which are configured based on a kind of interference or a type of interference of the macro cell, are configured by a subframe set of a position designated as non-ABS and a subframe set of a position designated as ABS, respectively. In this case, since there exist interference caused by UL communication of the macro cell and interference caused by DL communication of the macro cell in the set #A due to the non-ABS configuration, it may configure at least one of a plurality of channel state information (CSI) deducting and reporting operations, an interference estimating operation, and a channel state information process in consideration of the interference caused by UL communication of the macro cell and the interference caused by DL communication of the macro cell in the set #A. On the contrary, since there is no or less interference in the set #B due to the ABS configuration, it may configure at least one of one channel state information (CSI) deducting and reporting operation, an interference estimating operation and a channel state information process.

The aforementioned embodiments of the present invention can be extensively applied to at least one or more cases among a case that "UL-DL configuration information on SIB is differently configured between cells", a case of "Non-ideal backhaul or Ideal backhaul situation" and a case that "cooperation-related information is transmitted on a radio resource channel predefined between cells".

And, the aforementioned embodiments of the present invention can be configured to be limitedly applied to a case that a mode of dynamically changing a use of a radio resource is configured only.

And, the embodiments of the present invention can be extensively applied to a case that an operation of changing a use of a radio resource is performed based on a predefined period. And, the present invention can be extensively applied to a case that a radio resource of a specific component carrier (CC) or a specific cell is dynamically changed in a situation to which a carrier aggregation scheme is applied.

In addition, according to the present invention, the embodiments of the present invention can be extensively applied to a case that a use of a radio resource on an extension carrier is dynamically configured and changed in case of using the extension carrier (or a new carrier type) for communication based on a carrier aggregation scheme.

The aforementioned embodiments of the present invention can be extensively applied to a case that a macro cell and a pico cell use an identical channel band or a case that the macro cell and the pico cell use an adjacent channel band.

And, the aforementioned embodiments of the present invention can be extensively applied to a case that a macro cell and a pico cell coexist or a case that pico cells exist only. For instance, the present invention can be extensively applied to a case that the pica cells perform communication using a channel band different from a channel band of the macro cell or a channel band relatively away from the pico cells.

The aforementioned embodiments of the present invention have proposed various methods to which the present invention is applied. A principle of the methods is also included in the schemes proposed by the present invention.

Figure 14:
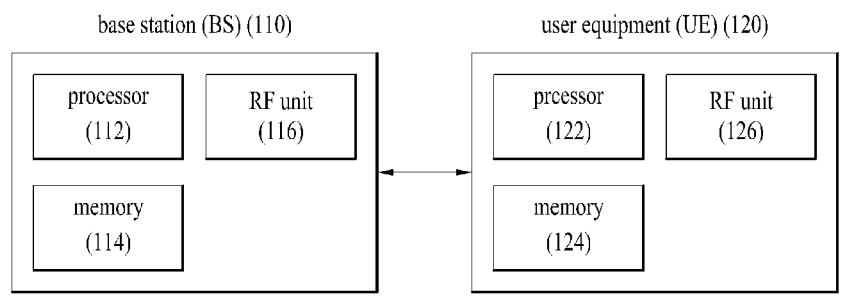
FIG. 14 is a diagram for an example of a base station and a user equipment applicable to embodiment of the present invention.

FIG. 14 is a diagram for an example of a base station and a user equipment applicable to embodiment of the present invention. If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 14, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 122 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of sharing radio resource information in a wireless communication system and apparatus therefor are described centering on examples applied to 3GPP LTE system, it may be applicable to various kinds of wireless communication systems as well as to the 3GPP LTE system.

What is claimed is:

1. A method of sharing radio resource information of a serving cell in a multi-cell wireless communication system, the method comprising:
    transmitting, by the serving cell, the radio resource information to a neighbor cell,
    wherein the radio resource information includes at least one candidate uplink-downlink configuration comprising at least one uplink subframe which is enabled to be changed to a downlink subframe, by using a bitmap,
    wherein the number of the at least one uplink subframe is configured according to a load state of the serving cell, and
    wherein the radio resource information further includes resource utilization information for the at least one uplink subframe;
    receiving, by the serving cell from the neighbor cell, a confirmation message in response to the radio resource information,
    wherein the confirmation message includes at least one allowable uplink-downlink configuration comprising the at least one acceptable subframe of the neighbor cell among the at least one uplink subframe,
    wherein the neighbor cell is a cell whose difference in time synchronization value with the serving cell is smaller than a predefined threshold value; and
    selecting, by the serving cell, the at least one allowable uplink-downlink configuration comprising the at least one acceptable subframe configured to be changed to correspond to the resource utilization information according to the number of the at least one uplink subframe based on a descending order for subframe indexes of the at least one uplink subframe.

2. The method of claim 1, wherein the confirmation message is transmitted based on a predefined physical radio channel or an X2 interface.

3. The method of claim 1, wherein the at least one uplink subframe is configured to make the neighbor cell not perform uplink-downlink communication.

4. The method of claim 1, wherein the confirmation message indicates that a use of the at least one uplink subframe is not allowed, and wherein the method further comprises receiving recommended radio resource use change information from the neighbor cell.

5. A method of sharing radio resource information in a multi-cell wireless communication system, the method comprising:
    receiving, by a neighbor cell, the radio resource information from a serving cell,
    wherein the radio resource information includes at least one candidate uplink-downlink configuration comprising at least one uplink subframe which is enabled to be changed to a downlink subframe, by using a bitmap,
    wherein the number of the at least one uplink subframe is configured according to a load state of the serving cell, and
    wherein the radio resource information further includes resource utilization information for the at least one uplink subframe;
    determining, by the neighbor cell, whether to allow a change of the usage of the at least one uplink subframe of the serving cell based on the radio resource information and an uplink-downlink communication load state of the neighbor cell;
    configuring, by the neighbor cell, at least one acceptable subframe to be changed to correspond to the resource utilization information according to the number of the at least one uplink subframe based on a descending order for subframe indexes of the at least one uplink subframe; and
    transmitting, by the neighbor cell to the serving cell, a confirmation message,
    wherein the confirmation message includes at least one allowable uplink-downlink configuration comprising the at least one acceptable subframe of the neighbor cell among the at least one uplink subframe, and
    wherein the neighbor cell is a cell whose difference in time synchronization value with the serving cell is smaller than a threshold value predefined.

* * * * *